US011997449B2

(12) United States Patent
Zheng et al.

(10) Patent No.: US 11,997,449 B2
(45) Date of Patent: May 28, 2024

(54) ULTRA-THIN SPEAKER

(71) Applicant: Goertek Inc., Shandong (CN)

(72) Inventors: Binghua Zheng, Weifang (CN); Zhiyong Dong, Weifang (CN)

(73) Assignee: Goertek Inc., Shandong (CN)

( * ) Notice: Subject to any disclaimer, the term of this patent is extended or adjusted under 35 U.S.C. 154(b) by 226 days.

(21) Appl. No.: 17/627,331

(22) PCT Filed: Dec. 27, 2019

(86) PCT No.: PCT/CN2019/129006
§ 371 (c)(1),
(2) Date: Jan. 14, 2022

(87) PCT Pub. No.: WO2021/012611
PCT Pub. Date: Jan. 28, 2021

(65) Prior Publication Data

US 2022/0272439 A1 Aug. 25, 2022

(30) Foreign Application Priority Data

Jul. 19, 2019 (CN) ......................... 201910656060.1

(51) Int. Cl.
*H04R 1/28* (2006.01)
*H04R 7/26* (2006.01)
(Continued)

(52) U.S. Cl.
CPC ............. *H04R 1/2811* (2013.01); *H04R 7/26* (2013.01); *H04R 9/025* (2013.01); *H04R 9/06* (2013.01)

(58) Field of Classification Search
CPC ........ H04R 7/26; H04R 1/2811; H04R 9/025; H04R 9/06
See application file for complete search history.

(56) References Cited

U.S. PATENT DOCUMENTS

2006/0008108 A1 1/2006 Huang et al.
2014/0013927 A1 * 1/2014 Ruffino .................. G10D 13/20 84/411 R

FOREIGN PATENT DOCUMENTS

CN 101860782 A 10/2010
CN 201854418 U * 6/2011

(Continued)

OTHER PUBLICATIONS

International Search Report dated Apr. 21, 2020 for International Patent Application No. PCT/CN2019/129006.

*Primary Examiner* — Sunita Joshi
(74) *Attorney, Agent, or Firm* — Baker Botts LLP

(57) ABSTRACT

Disclosed is an ultra-thin speaker comprising: a housing; and a magnetic circuit system therein; a vibration system comprising a cone assembly and a voice coil, the cone assembly having a taper≤25°, a peripheral edge thereof connected to the housing, and a middle part thereof having a through hole, the voice coil is fixedly connected at an edge of the through hole, the voice coil surrounds and is suspended around the magnetic circuit system, being able to vibrate by an action of the magnetic field generated by the system when a sound signal is introduced; and a dust cap assembly comprising a dust cap body, a central region of the dust cap body is fixedly connected to the system, and an edge region of the dust cap body is connected to the cone assembly and is able to expand and contract along with the vibration of the cone assembly.

10 Claims, 2 Drawing Sheets

(51) Int. Cl.
*H04R 9/02* (2006.01)
*H04R 9/06* (2006.01)

(56) References Cited

FOREIGN PATENT DOCUMENTS

| | | | | |
|---|---|---|---|---|
| CN | 201854418 | U | | 6/2011 |
| CN | 202261781 | U | * | 5/2012 |
| CN | 202261781 | U | | 5/2012 |
| CN | 202738092 | U | * | 2/2013 |
| CN | 202738092 | U | | 2/2013 |
| CN | 105828257 | A | | 8/2016 |
| CN | 110337053 | A | | 10/2019 |

* cited by examiner

ULTRA-THIN SPEAKER

CROSS-REFERENCE TO RELATED APPLICATIONS

This application is a National Stage of International Application No. PCT/CN2019/129006, filed on Dec. 27, 2019, which claims priority to Chinese Patent Application No. 201910656060.1, filed Jun. 19, 2019, both of which are hereby incorporated by reference in their entireties.

TECHNICAL FIELD

The present disclosure belongs to the technical field of electroacoustic transducer, in particular to an ultra-thin speaker.

BACKGROUND

A speaker is a transducer that converts electrical signals into sound. Audio energy makes cone or diaphragm vibrate and resonate with surrounding air through electromagnetic, piezoelectric or electrostatic effects. A speaker is the most fragile component in sound equipment, but it is the most important component for sound effect. Ultra-thin speakers are required for ultra-thin electronic products such as ultra-thin liquid crystal displays. In an existing speaker, the dust cap has a fixed height, and the dust cap is directly connected with voice coil as a part of vibration system. When it comes to the ultra-thin speaker, a total thickness of speaker, excluding the thickness of the magnetic circuit system and the stroke of the vibration system, leaves little space for the conventional dust cap structure. In addition, in the prior art, in order to design the ultra-thin speaker, the magnetic circuit design solution without U-iron is generally selected to reduce a full height of the unit, but a magnetic gap of the traditional unit cannot be formed because of the absence of U-iron, causing reduction to strength of the magnetic field acting on the coil.

In view of this, it is necessary to provide a new technical solution to solve the above technical problems.

SUMMARY

An object of the present disclosure is to provide a new technical solution of an ultra-thin speaker.

According to a first aspect of the present disclosure, an ultra-thin speaker is provided, which includes:

a housing;

a magnetic circuit system disposed in the housing;

a vibration system including a cone assembly and a voice coil, wherein the cone assembly has a taper of less than or equal to 25°, a peripheral edge of the cone assembly is connected to the housing, and a middle part of the cone assembly has a through hole, the voice coil is fixedly connected at an edge of the through hole, the voice coil surrounds and is suspended around the magnetic circuit system, the voice coil is configured to be able to vibrate by an action of the magnetic field generated by the magnetic circuit system when a sound signal is introduced; and a dust cap assembly including a dust cap body, wherein a central region of the dust cap body is fixedly connected to the magnetic circuit system, and an edge region of the dust cap body is connected to the cone assembly and is configured to be able to expand and contract along with the vibration of the cone assembly.

Alternatively, the dust cap body includes a fixing portion and a telescopic portion extending around the fixing portion, wherein the fixing portion is fixedly connected to a top of the magnetic circuit system, an edge of the telescopic portion is connected to the cone assembly so that the dust cap body covers the magnetic circuit system and the voice coil, and the telescopic portion is configured to be able to expand and contract in response to vibration of the cone assembly.

Alternatively, the dust cap assembly further includes a thermal insulation pad disposed between the fixing portion of the dust cap body and the magnetic circuit system.

Alternatively, the magnetic circuit system includes a first magnet, a second magnet and a plate, wherein same poles of the first magnet and the second magnet are disposed opposite to each other, the plate is disposed between the first magnet and the second magnet, and a magnetizing direction of the first magnet and the second magnet is parallel to a vibration direction of the voice coil. The plate may be a concentrating flux plate.

Alternatively, the vibration system further includes a damper connected to the voice coil, the damper having a loop structure, an inner edge of the damper being connected to the voice coil, and an outer edge of the damper being connected to the housing.

Alternatively, the voice coil includes an outer bobbin, an inner bobbin, and a coil wound between the outer bobbin and the inner bobbin, with the inner edge of the damper being connected to the outer bobbin.

Alternatively, a conductive sheet is fixedly disposed on the outer bobbin, the coil is electrically connected with the conductive sheet, and circuit leads are disposed on the damper, the conductive sheet is electrically connected with the circuit leads, and the circuit leads are configured for electrically connecting with an external device.

Alternatively, the circuit leads are coated on a surface of the damper in a form of braided metal wires.

Alternatively, the outer bobbin and/or the inner bobbin are provided thereon with heat dissipation holes.

Alternatively, a taper of the cone assembly is less than 15°; a height of the ultra-thin speaker is less than or equal to 10 mm.

Alternatively, the dust cap body is made of PU.

In the ultra-thin speaker of the present disclosure, the cone assembly is of a shape resembling a flat board with a taper less than or equal to 25°, which is beneficial to the ultra-thin design of the whole speaker structure; and as the fixing portion of the dust cap body is connected with the top of the magnetic circuit system, and the edge of the telescopic portion of the dust cap body is connected with the cone assembly, when the dust cap body vibrates with the cone assembly, a vibration amplitude of the telescopic portion near the fixing portion of the dust cap body is extremely small, and basically only the edge of the telescopic portion vibrates with the cone assembly, so the cone assembly vibration stroke is ensured, and the space in the speaker is greatly saved, which is beneficial to ensuring the overall ultra-thin structure of the speaker.

Other features and advantages of the present disclosure will become apparent from the following detailed description of exemplary embodiments of the present disclosure with reference to the appended drawings.

BRIEF DESCRIPTION OF THE DRAWINGS

The accompanying drawings which are incorporated in and constitute a part of the description illustrate embodiments of the present disclosure and together with the description thereof serve to explain the principles of the embodiments of the present disclosure.

DETAILED DESCRIPTION OF THE EMBODIMENTS

Figure 1:
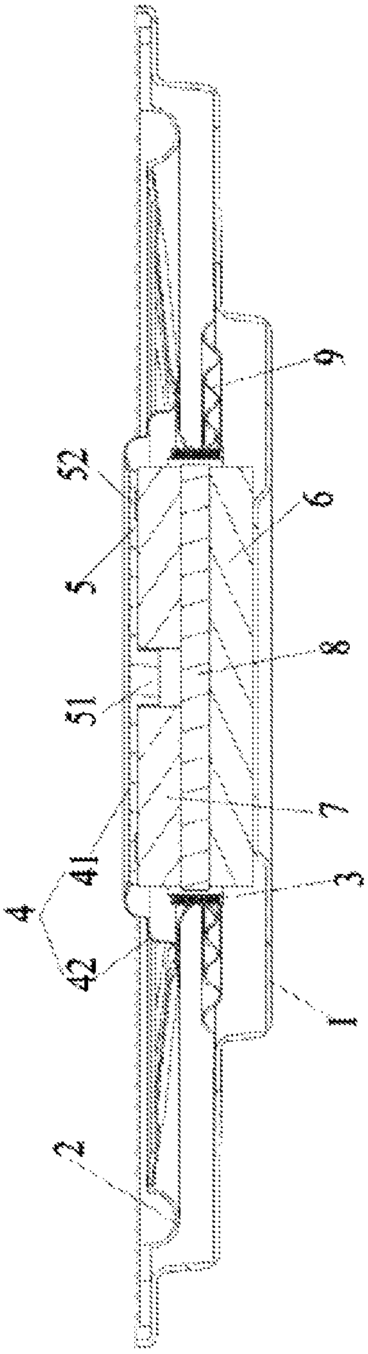
FIG. 1 is a sectional structural diagram of an ultra-thin speaker provided by the present disclosure.

Various exemplary embodiments of the present disclosure will be described in detail with reference to the accompanying drawings. It should be noted that unless otherwise specified, the relative arrangement, numerical expressions and values of components and steps set forth in these embodiments do not limit the scope of the present disclosure.

The following description of at least one exemplary embodiment is in fact merely illustrative and is in no way intended to limit the present disclosure and its application or use.

Techniques, methods and devices known to those ordinarily skilled in the relevant art may not be discussed in detail, but where appropriate, the techniques, methods and devices should be regarded as part of the authorized description.

In all the examples shown and discussed herein, any specific value should be interpreted as exemplary only and not as a limitation. Thus, other examples of the exemplary embodiment can have different values.

It should be noted that similar reference numerals and letters denote similar items in the following figures, and therefore, once a certain item is defined in one figure, it is not necessary to further discuss it in the following figures.

Referring to FIG. 1, an embodiment of the present disclosure provides an ultra-thin speaker. The ultra-thin speaker includes a housing 1, a magnetic circuit system, a vibration system and a dust cap assembly. The magnetic circuit system is disposed in the housing 1, the magnetic circuit system is used to generate a magnetic field, the vibration system includes a cone assembly 2 and a voice coil 3, and the cone assembly has a taper of less than or equal to 25°. In a more preferred solution, the taper of the cone assembly 2 can be made less than 15°, that is, a shape of the cone assembly 2 is close to a flat board, which is conducive to the overall ultra-thin design of the speaker structure. Alternatively, a height of the ultra-thin speaker can be made less than or equal to 10 mm by designing a dimension of the housing 1 and a structure of the cone assembly 2.

A peripheral edge of the cone assembly 2 is connected to the housing 1, a middle part of the cone assembly 2 has a through hole, the voice coil 3 is fixedly connected at an edge of the through hole, the voice coil 3 surrounds and is suspended around the magnetic circuit system, the voice coil 3 is configured to be able to vibrate by an action of the magnetic field generated by the magnetic circuit system when a sound signal is introduced, and the voice coil 3 vibrates and drives the cone assembly 2 to vibrate together.

Figure 2:
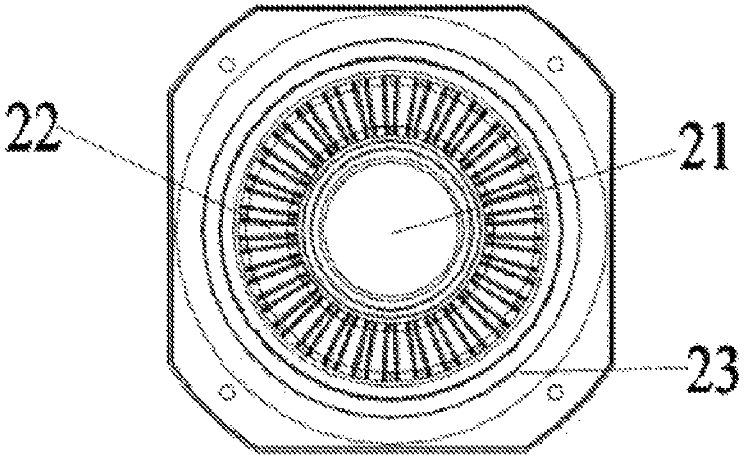
FIG. 2 is a structural diagram of a cone assembly in the ultra-thin speaker provided by the present disclosure.

Referring to FIG. 2, in one embodiment, the middle part of the cone assembly 2 has a through hole 21, a central portion 22 is disposed around the through hole 21, and an edge portion 23 is disposed around the central portion 22. The taper of the cone assembly 2 generally refers to a taper of the central portion 22, while the edge portion 23 has no taper. The central portion 22 is made of aluminum alloy, and the central portion 22 is provided with reinforcing ribs to enhance the rigidity of the whole cone assembly 2. In the present embodiment, an outer edge of the edge portion 23 is connected to the housing 1, and the voice coil 3 is fixedly connected to the edge of the through hole 21.

The dust cap assembly includes a dust cap body 4, a central region of the dust cap body 4 is fixedly connected to the magnetic circuit system, and an edge region of the dust cap body 4 is connected to the cone assembly 2 and is configured to be able to expand and contract along with the vibration of the cone assembly 2.

In one embodiment, the dust cap body 4 includes a fixing portion 41 and a telescopic portion 42 extending around the fixing portion 41, the entire dust cap body 4 has a shape resembling a hat, the fixing portion 41 is fixedly connected to a top of the magnetic circuit system, an edge of the telescopic portion 42 is connected to the cone assembly 2 so that the dust cap body 4 covers the magnetic circuit system and the voice coil 3, to prevent foreign matter and dust from falling into the magnetic circuit system and voice coil 3 to affect their normal operation. The telescopic portion 42 is configured to be able to expand and contract along with the vibration of the cone assembly 2.

In the prior art, the whole dust cap is directly connected with the voice coil as a part of the vibration system, and when the voice coil vibrates, the whole dust cap vibrates together with the voice coil. For the ultra-thin speaker, it is generally required that the full height of the speaker, including the stroke of the vibration system, should not exceed 12 mm. In order to ensure that the voice coil has a strong subwoofer effect and can withstand a large power, the stroke of the vibration system is generally about 3 mm, while a size from the top of the magnetic circuit system to the fixing portion of the speaker is generally about 9 mm, so there is almost no space to install the existing dust cap structure. According to the ultra-thin speaker in the present disclosure, the fixing portion 41 of the dust cap body is planar, and the planar fixing portion 41 is fixedly connected to the top of the magnetic circuit system. Since the magnetic circuit system is fixed, the fixing portion 41 is also fixed, so that the upward stroke of the fixing portion 41 is limited. Since the edge of the telescopic portion 42 of the dust cap body 4 is connected to the cone assembly 2, the telescopic portion 42 of the cone assembly 4 of the present disclosure is configured to be able to extend or compress with the vibration of the dust cap body 2 in order to avoid preventing upward vibration of the cone assembly 2 due to the fixed fixing portion 41. So when cone assembly 2 vibrates, a portion of the telescopic portion 42 close to the fixing portion 41 has only a slight upward and downward movement of about 0.5 mm, while the edge of the telescopic portion 42 vibrates along with the cone assembly 2, this means that one end of the telescopic portion 42 only vibrates slightly, while the other end vibrates together with the cone assembly 2, so that the vibration system of the cone assembly 2 and the voice coil 3 can have a stroke of about 3 mm. At this time, the edge of the telescopic portion 42 connected to the cone assembly 2 vibrates up and down with a stroke of about 3 mm together with the vibration system. At the same time, since the telescopic portion 42 does not have a fixed height, but can be extended or compressed following the vibration of the cone assembly 2, the space in the speaker can be greatly saved while ensuring the vibration stroke, which is beneficial to ensuring the overall ultra-thin structure of the speaker. As the stroke range of the voice coil is ensured, the maximum power of the ultra-thin speaker of the present disclosure can exceed 20 W-30 W, the sensitivity is higher, and the resonant frequency can be made lower. The ultra-thin speaker of the present disclosure can be applied to ultra-thin electronic products such as ultra-thin liquid crystal displays and used as a bass or subwoofer.

In one embodiment, the dust cap body is made of PU (polyurethane). The PU is not only light in weight, but also good in elasticity, and the dust cap body made of PU is beneficial to the telescopic movement of the telescopic portion 42.

In one embodiment, the dust cap assembly further includes a thermal insulation pad 5 disposed between the fixing portion 41 of the dust cap body 4 and the magnetic circuit system. If the dust cap body is directly connected to the magnetic circuit system, due to the long-term work, a temperature of the magnet may reach above 100° C. which may lead to the deformation of the dust cap body and affect the service life of the product. A thermal insulation pad can be added between the dust cap body and the magnetic circuit system. The thermal insulation pad can be made of plastic, which can play a good thermal insulation role and make the dust cap body not easy to deform during operation.

The dust cap body 4 provided by the present disclosure is not limited to only one embodiment, in another alternative embodiment, a through hole is provided in the middle part of the fixing portion 41 of the dust cap body 4, the edge of the thermal insulation pad 5 is disposed outside the fixing portion 41, and the middle part of the thermal insulation pad 5 is configured to be fixedly connected with the magnetic circuit system of the ultra-thin speaker via the through hole. Such a design is conducive to reducing the materials used in the dust cap body 4 and reducing the quality of dust cap body 4.

In one embodiment, the magnetic circuit system includes a first magnet 6, a second magnet 7 and a plate 8, same poles of the first magnet 6 and the second magnet 7 are disposed opposite to each other, the plate 8 is disposed between the first magnet 6 and the second magnet 7, and a magnetizing direction of the first magnet 6 and the second magnet 7 is parallel to a vibration direction of the voice coil 3. The plate 8 may be a concentrating flux plate.

In the ultra-thin speaker, the magnetic circuit design form without U iron is generally used to reduce the full height of the speaker, but since there is no U iron, the magnetic gap of the traditional unit cannot be formed, and the magnetic field strength acting on the voice coil will be reduced. In the ultra-thin speaker of the present disclosure, by arranging a pair of magnets with opposite magnetizing directions, that is, the first magnet 6 and the second magnet 7 disposed opposite to each other at the same pole, for example, the N pole of the first magnet 6 is opposite to the N pole of the second magnet 7, so that the magnetic induction lines can perpendicularly pass through the voice coil when emitting outward, and the magnetic induction lines are densely distributed, so that the magnetic field can be efficiently utilized and the problem of magnetic field strength reduction brought about by the absence of U iron. Because there is no traditional magnetic gap, there is no need to consider magnetic gap rubbing on the voice coil, and the risk of product defect rate is reduced. Alternatively, the first magnet 6 and the second magnet 7 are of exactly the same size to ensure the balance of the upper and lower magnetic lines of force.

In an alternative embodiment of the present disclosure, the dust cap assembly is bonded to the second magnet 7 at an upper surface thereof. When the thermal insulation pad 5 is provided, the fixing portion 41 of the dust cap body is bonded to the thermal insulation pad 5, and the thermal insulation pad 5 is then bonded to the second magnet 7.

Alternatively, a connecting hole is provided in the middle part of the second magnet 7, and a projection 51 matching the connecting hole of the second magnet 7 is provided at a middle position of the thermal insulation pad 5, the projection 51 is embedded in the connecting hole, and glue is applied around the projection 51 so that the thermal insulation pad 5 and the second magnet 7 are bonded together. Matching connection between the projection 51 and the connection hole of the second magnet 7 can contribute to the accuracy of positioning when the thermal insulation pad 5 is connected to the second magnet 7, and when the projection 51 and the connection hole of the second magnet 7 are in interference fit, the stability of the connection between the thermal insulation pad 5 and the second magnet 7 can be improved. Alternatively, an overflow glue groove 52 is provided on a surface of the thermal insulation pad 5 bonded to the second magnet 7, to prevent the glue from overflowing. The overflow glue groove 52 may be provided as an integral looped groove, or a plurality of overflow glue grooves 52 may be disposed in a discrete distribution form. Since the glue is applied to a plane of the thermal insulation pad 5 and the second magnet 7 for bonding, the glue will overflow inevitably when the thermal insulation pad 5 and the second magnet 7 are pressed, and the glue overflowing to other parts will affect the product quality, and providing the overflow glue groove 52 can effectively avoid this technical problem.

In one embodiment, the vibration system further includes a damper 9 connected to the voice coil 3, the damper 9 has a loop structure, and the damper 9 is provided with a corrugated structure. The corrugated structure can be resiliently deformed, so that the damper 9 can elastically support and position the voice coil 3.

Alternatively, the corrugated structure may feature a gradual increase in ripple amplitude from an inner ring to an outer ring of the damper. Compared with a structure with identical ripple amplitude, the corrugated structure with gradually increasing ripple amplitude from inner ring to outer ring can improve the linearity of the damper and improve the anti-fatigue deformation performance of the damper.

Alternatively, the damper 9 is made by double-strand nomax fiber, which is impact resistant, fatigue resistant, high power resistant, and has high flame retardancy and water resistance. The inner edge of the damper 9 is connected to the voice coil 3, and the outer edge of the damper 9 is connected to the housing 1. The damper 9 directly to voice coil 3 and, and the cone assembly 2 is also directly connected to voice coil 3 as mentioned before, which can reduce the height of the magnetic circuit system of the speaker, and is very beneficial to the ultra-thin design of the speaker.

Figure 3:
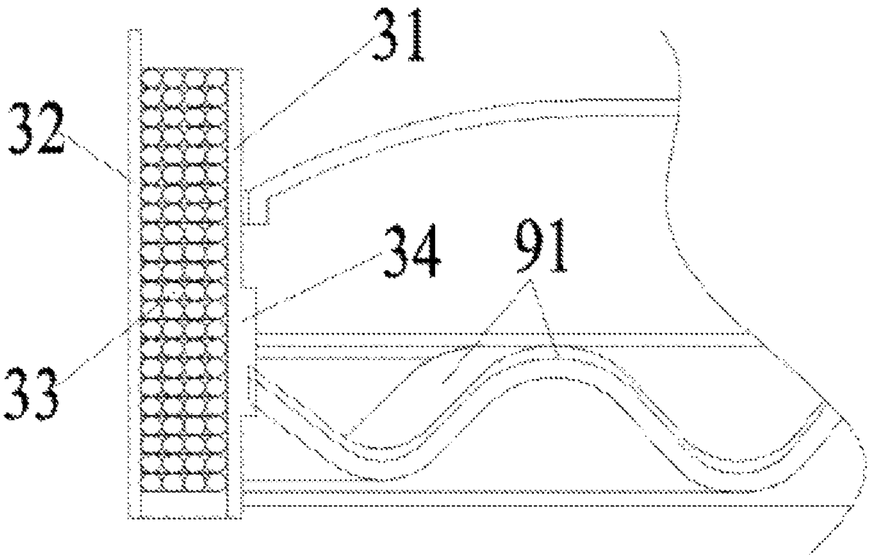
FIG. 3 is a diagram of a connection between a voice coil and a damper in the ultra-thin speaker provided by the present disclosure.

Referring to FIG. 3, in a preferred embodiment, the voice coil 3 includes an outer bobbin 31, an inner bobbin 32 and a coil 33 wound between the outer bobbin 31 and the inner bobbin 32, i.e., the coil 33 of the voice coil 3 is completely enclosed, ensuring the reliability of the coil 33. Compared with the voice coil structure in the prior art, the voice coil 3 of the present disclosure omits the voice coil bobbin in the shape of a cylindrical cylinder, which reduces the overall height of the speaker and is beneficial to the ultra-thin design of the speaker. The inner edge of the damper 9 is connected to the outer bobbin 31.

Alternatively, further in one embodiment, a conductive sheet 34 is fixedly disposed on the outer bobbin 31, and alternatively, the conductive sheet 34 is a tin foil, and the tin foil is welded to the outer bobbin 31. The coil 33 is electrically connected to the conductive sheet 34, and circuit leads 91 are provided on the damper 9, the conductive sheet 34 is electrically connected to the circuit leads 91, and the circuit leads 91 are configured to be electrically connected to external devices. In the existing speaker products, when the damper or the cone assembly is combined with the voice coil, lead wires are all connected from the voice coil bobbin or the cone assembly, but when the lead wires cannot be connected from these two positions, there is no suitable method to solve this problem. According to the present disclosure, the problem of the wire leading is easily solved by disposing the conductive sheet 34 on the outer bobbin 31 of the voice coil 3 and arranging the circuit leads 91 on the damper 9, and electrically connecting the conductive sheet 34 and the circuit leads 91.

In one embodiment, the circuit leads 91 are coated on a surface of the damper 9 in a form of braided metal wires. Specifically, the circuit leads 91 are provided on the surface of the damper 9 by braiding silver flat wires in a cloth braiding manner, and are integrally formed with the damper 9 by hot press molding. Alternatively, the circuit leads 91 are braided using seven strands of silver flat wires with a width of 2 mm, and the silver flat wires can be braided to the interior of the damper 9.

Alternatively, the circuit leads 91 are electrically connected to the conductive sheet 34 by welding, and the inner edge of the damper 9 is simultaneously connected to the outer bobbin 31 of the voice coil 3 by welding. Since the coil 33 is electrically connected to the conductive sheet 34, which in turn is electrically connected to the circuit leads 91, and the circuit leads 91 are electrically connected to the external devices, the coil 33 can be electrically connected to the external devices.

In one embodiment, the outer bobbin 31 and/or the inner bobbin 32 are provided thereon with heat dissipation holes, and the arrangement of the heat dissipation holes can effectively increase the heat dissipation capacity of the voice coil 3 during operation. In one embodiment, a bottom wall of the housing 1 is provided with solder pads for soldering with external equipment.

While some specific embodiments of the present disclosure have been described in detail by way of examples, it should be understood by those skilled in the art that the above examples are for illustration only and are not intended to limit the scope of the present disclosure. It will be apparent to those skilled in the art that modifications to the above embodiment can be made without departing from the scope or spirit of the present disclosure. The scope of the present disclosure is limited by the appended claims.

What is claimed is:

1. An ultra-thin speaker, comprising:

a housing;

a magnetic circuit system adapted to generate a magnetic field disposed in the housing;

a vibration system comprising a cone assembly and a voice coil, wherein the cone assembly has a taper of less than or equal to 25°, a peripheral edge of the cone assembly is connected to the housing, and a middle part of the cone assembly has a through hole, the voice coil is fixedly connected at an edge of the through hole, the voice coil surrounds and is suspended around the magnetic circuit system, the voice coil is configured to be able to vibrate by an action of the magnetic field generated by the magnetic circuit system when a sound signal is introduced; and a dust cap assembly comprising a dust cap body, wherein a central region of the dust cap body is fixedly connected to the magnetic circuit system, and an edge region of the dust cap body is connected to the cone assembly and is configured to be able to expand and contract along with the vibration of the cone assembly, wherein the dust cap body comprises a fixing portion and a telescopic portion extending around the fixing portion, wherein the fixing portion is fixedly connected to a top of the magnetic circuit system, an edge of the telescopic portion is connected to the cone assembly so that the dust cap body covers the magnetic circuit system and the voice coil, and the telescopic portion is configured to expand and contract in response to vibration of the cone assembly.

2. The ultra-thin speaker of claim 1, wherein the dust cap assembly further comprises a thermal insulation pad disposed between the fixing portion of the dust cap body and the magnetic circuit system.

3. The ultra-thin speaker of claim 1, wherein the magnetic circuit system comprises a first magnet, a second magnet and a plate, wherein the first magnet and the second magnet are disposed having magnetic poles thereof positioned opposite to each other, the plate is disposed between the first magnet and the second magnet, and a magnetizing direction of the first magnet and the second magnet is parallel to a vibration direction of the voice coil.

4. The ultra-thin speaker of claim 1, wherein the vibration system further comprises a damper connected to the voice coil, the damper having a loop structure, an inner edge of the damper being connected to the voice coil, and an outer edge of the damper being connected to the housing.

5. The ultra-thin speaker of claim 4, wherein the voice coil comprises an outer bobbin, an inner bobbin, and a coil wound between the outer bobbin and the inner bobbin, with the inner edge of the damper being connected to the outer bobbin.

6. The ultra-thin speaker of claim 5, wherein a conductive sheet is fixedly disposed on the outer bobbin, the coil is electrically connected with the conductive sheet, and circuit leads are disposed on the damper, the conductive sheet is electrically connected with the circuit leads, and the circuit leads are configured for electrically connecting with an external device.

7. The ultra-thin speaker of claim 6, wherein the circuit leads are coated on a surface of the damper in a form of braided metal wires.

8. The ultra-thin speaker of claim 5, wherein the outer bobbin and/or the inner bobbin are provided thereon with heat dissipation holes.

9. The ultra-thin speaker of claim 1, wherein a taper of the cone assembly is less than 15°; and a height of the ultra-thin speaker is less than or equal to 10 mm.

10. The ultra-thin speaker of claim 1, wherein the dust cap body is made of PU.

* * * * *